(No Model.)
E. D. SCHMIDT.
FRICTION CLUTCH.
No. 529,755. Patented Nov. 27, 1894.
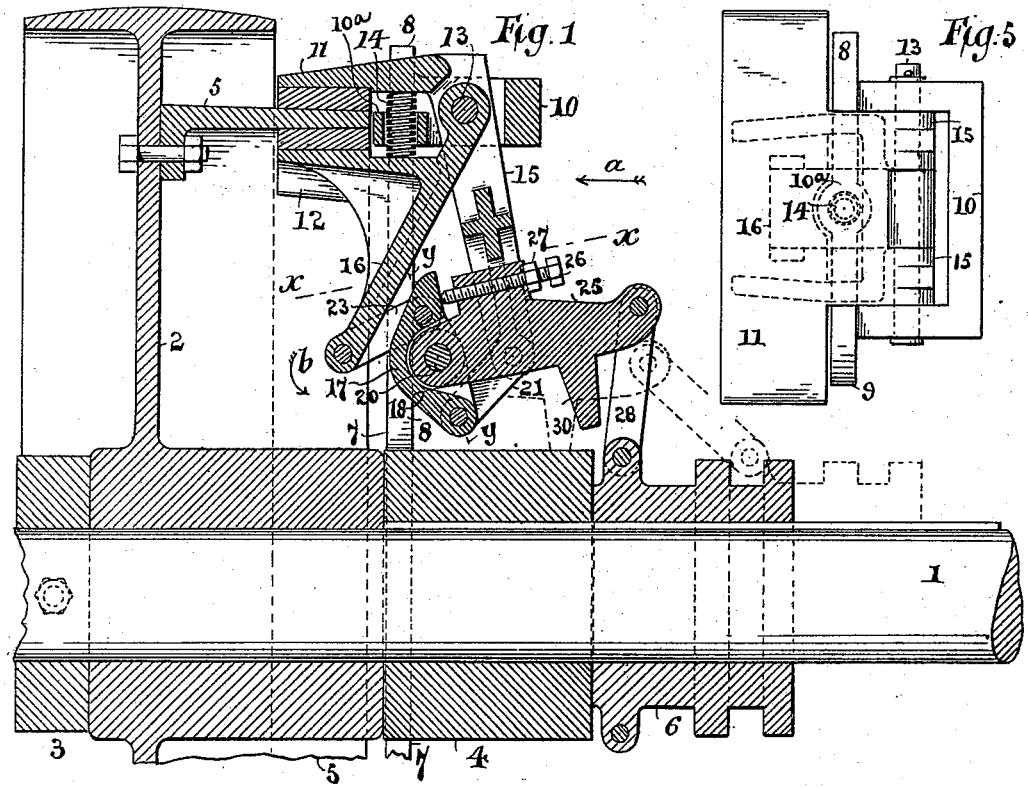
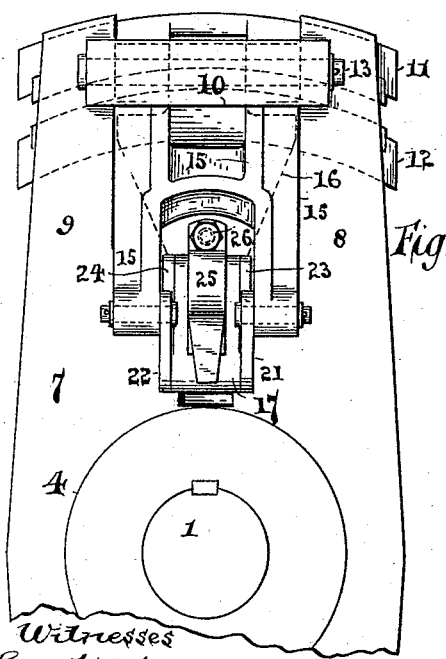
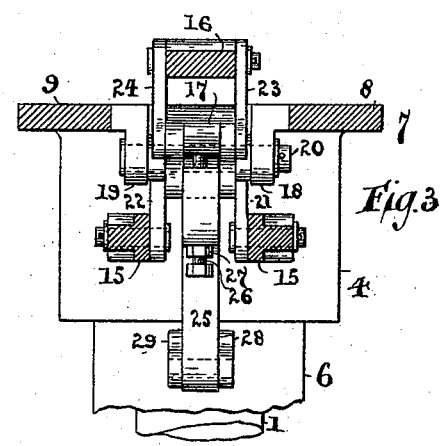
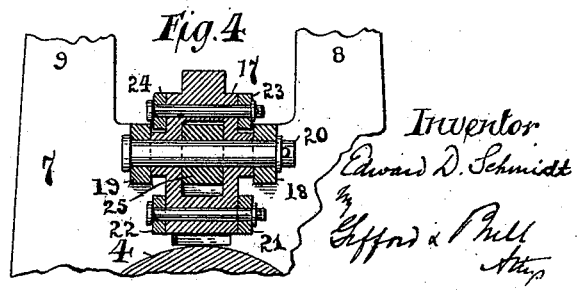
Witnesses
Geo. Wadman
M. Wilson
Inventor
Edward D. Schmidt
by
Gifford & Bull
Attys

UNITED STATES PATENT OFFICE.

EDWARD D. SCHMIDT, OF CUYAHOGA FALLS, OHIO.

FRICTION-CLUTCH.

SPECIFICATION forming part of Letters Patent No. 529,755, dated November 27, 1894.

Application filed June 20, 1894. Serial No. 515,204. (No model.)

*To all whom it may concern:*

Be it known that I, EDWARD D. SCHMIDT, a citizen of the United States, and a resident of Cuyahoga Falls, in the county of Summit and State of Ohio, have invented certain new and useful Improvements in Friction-Clutches, of which the following is a specification.

In the accompanying drawings Figure 1 is a vertical section, in the plane of the axis, of a portion of a pulley with a clutch mechanism, of which there may be several and in general will be at least two, arranged on opposite sides of the shaft. Fig. 2 is an elevation of one of the clutch mechanisms viewed in the direction of the arrow $a$, Fig. 1, with the shifting collar omitted. Fig. 3 is a section on the line $x, x$, Fig. 1. Fig. 4 is a section on the line $y, y$, Fig. 1. Fig. 5 is a plan view of the upper portion of the clutch.

1 is a shaft.

2 is a pulley free to revolve on the shaft but fixed longitudinally between the collars 3 and 4.

5 is the usual cylindrical friction flange secured to the pulley.

6 is the usual shifting collar splined to the shaft.

The collar 4 constitutes a hub for the clutch arm 7 and is keyed to the shaft. The clutch arm 7 is forked at its upper end so as to contain the two branches 8 and 9, the opening between which at their extremities is bridged by the bridge piece 10.

11 and 12 are the clutch jaws both of which are pivoted to the bridge piece 10 by the pin 13.

14 is a coiled spring interposed between the jaws to repel them from each other. The mechanism by which the jaws are forced toward each other so as to engage the friction flange 5 may be described as follows:

15 is an arm rigidly connected with the jaw 11.

16 is an arm rigidly connected with the jaw 12.

17 is a rocker arranged between the lugs 18 and 19 of the clutch arm to which it is pivoted by the pin 20. The extremities of this rocker on opposite sides of the pin 20 are connected respectively with the arm 15 by the links 21 and 22 and with the arm 16 by the links 23 and 24 so that whenever the rocker rotates in the direction of the arrow $b$, Fig. 1, the jaws 11 and 12 will be forced toward each other and whenever it rotates in the opposite direction the jaws will move apart.

A desirable mechanism for communicating the motion of the sleeve 6 to the rocker 17 may be as follows:

25 is a lever the forward end of which is recessed within the rocker 17 and is pivoted upon pin 20.

26 is a set screw threaded in the lever 25 bearing against the extremity of the rocker with which the jaw 12 is connected.

27 is a jam nut by which the adjustment of the set screw is fixed.

28 and 29 are links connecting the free end of the lever 25 with the sleeve 6, which links upon moving past the vertical as shown in full lines, Fig. 1, serve to lock the clutch jaws in their clutching position.

30 is a stop which upon the backward movement of the sleeve 6 strikes against the hub 4 as shown in dotted lines, Fig. 1 and limits the extent of the clutching movement.

The operation is as follows: When the sleeve 6 is in the position shown in dotted lines, Fig. 1, the jaws will be separated from the friction flange. By forcing the sleeve 6 toward the hub 4 the jaws will be made to clutch the flange and will be locked in that position. Any wear of the jaws may be taken up by the adjusting screw 26.

The advantages in the above clutch exist in its great power combined with its capacity for being made cheaply and with minimum amount of lathe-work and with parts susceptible of duplication to any extent.

What I claim is—

1. In a clutch mechanism in combination two inversely operating clutch jaws arranged circumferentially with respect to the shaft, a clutch arm, a pivot substantially at right angles to the shaft upon which said jaws are collectively pivoted to the clutch arm, a rocker, a pivot whereon said rocker is pivoted to the clutch arm between the pivot of the jaws and the shaft, arms secured respectively to said jaws and extending inwardly on opposite sides of said rocker, means whereby said jaw arms are connected respectively with said rocker on opposite sides of its center of motion and mechanism whereby said rocker is connected with the shifting sleeve, substantially as described.

2. In a clutch mechanism in combination two inversely operating clutch jaws arranged circumferentially at right angles to the shaft a clutch arm, a pivot substantially at right angles to the shaft upon which said jaws are collectively pivoted to the clutch arm, a rocker, a pivot whereon said rocker is pivoted to the clutch arm between the pivot of the jaws and the shaft, arms secured respectively to said jaws and extending inwardly on opposite sides of said rocker, links whereby said jaws are connected respectively with said rocker on opposite sides of its center of motion and mechanism whereby said rocker is connected with the shifting sleeve, substantially as described.

3. In a clutch mechanism in combination two inversely operating clutch jaws arranged circumferentially with respect to the shaft, a clutch arm, a pivot substantially at right angles to the shaft upon which said jaws are collectively pivoted to the clutch arm, a rocker, a pivot whereon said rocker is pivoted to the clutch arm between the pivot of the jaws and the shaft, arms secured respectively to said jaws and extending inwardly on opposite sides of said rocker, means whereby said jaw arms are connected respectively with said rocker on opposite sides of its center of motion, a lever mounted upon the same pivot as said rocker, means of adjustment interposed between said lever at one extremity of said rocker and mechanism whereby said lever is pivotally connected to the shifting sleeve, substantially as described.

Signed at Cuyahoga Falls, in the county of Summit and State of Ohio, this 11th day of June, A. D. 1894.

EDWARD D. SCHMIDT.

Witnesses:
E. L. BABCOCK,
THOS. F. WALSH.